United States Patent
Mochizuki et al.

(10) Patent No.: US 9,413,216 B2
(45) Date of Patent: Aug. 9, 2016

(54) MAGNETIC ROTATION ACCELERATOR AND POWER GENERATION SYSTEM INCLUDING THE SAME

(71) Applicants: Se Myung Suk, Las Vegas, NV (US); Young Jun Suk, Las Vegas, NV (US)

(72) Inventors: Hatsuhiro Mochizuki, Osaka (JP); Song Gon Suk, Las Vegas, NV (US); Moon Hwa Chang, Seoul (KR); Se Myung Suk, Las Vegas, NV (US); Young Jun Suk, Las Vegas, NV (US)

(73) Assignees: Se Myung Suk, Las Vegas, NV (US); Young Jun Suk, Las Vegas, NV (US)

( * ) Notice: Subject to any disclaimer, the term of this patent is extended or adjusted under 35 U.S.C. 154(b) by 0 days.

(21) Appl. No.: 14/943,795

(22) Filed: Nov. 17, 2015

(65) Prior Publication Data

US 2016/0141946 A1 May 19, 2016

(30) Foreign Application Priority Data

Nov. 17, 2014 (KR) .................. 10-2014-0160126

(51) Int. Cl.
*H02K 7/06* (2006.01)
*H02K 47/00* (2006.01)
(Continued)

(52) U.S. Cl.
CPC *H02K 47/00* (2013.01); *H02K 7/06* (2013.01); *H02K 7/065* (2013.01); *H02K 53/00* (2013.01); *Y10S 74/09* (2013.01)

(58) Field of Classification Search
CPC ........... H02K 7/06; H02K 7/065; F16H 25/20
USPC .............................................. 310/113, 20, 80
See application file for complete search history.

(56) References Cited

U.S. PATENT DOCUMENTS 5,594,289 A * 1/1997 Minato .................. H02K 29/10
    310/152
6,433,453 B1 8/2002 Kitayoshi
(Continued)

FOREIGN PATENT DOCUMENTS

JP      H09-285103      10/1997
JP      2003-259622      9/2003
(Continued)

OTHER PUBLICATIONS

Dehandschoewercker, E. et al., "Surfing a magnetic wave," retrieved from the internet, >http://cmd25jmc14.sciencesconf.org/38295/document>, Jul. 13, 2015.
(Continued)

*Primary Examiner* — Hanh Nguyen
(74) *Attorney, Agent, or Firm* — Snyder, Clark, Lesch & Chung, LLP

(57) ABSTRACT

Provided are a magnetic rotation accelerator and a power generation system. The magnetic rotation accelerator includes: a shaft; a fixed plate through which the shaft penetrates and on which a plurality of first magnetic units are disposed; and a rotary plate through which the shaft penetrates, which faces the fixed plate and on which a plurality of second magnetic units are disposed, wherein a repulsive force is generated between the first magnetic units and the second magnetic units, the first magnetic units form a first row and a second row around the shaft, and the second magnetic units form a third row and a fourth row around the shaft, wherein central axes of the first magnetic units of the first row are in phase with central axes of the first magnetic units of the second row, and central axes of the second magnetic units of the third row are out of phase with central axes of the second magnetic units of the fourth row.

16 Claims, 15 Drawing Sheets

(51) Int. Cl.
*H02K 53/00* (2006.01)
*H02K 7/065* (2006.01)

(56) References Cited

U.S. PATENT DOCUMENTS

| | | | | |
|---|---|---|---|---|
| 7,151,332 B2 * | 12/2006 | Kundel | ................... | H02K 49/10 310/15 |
| 8,487,484 B1 * | 7/2013 | Miller, Jr. | ............ | H02K 49/102 310/12.14 |
| 2004/0041479 A1 * | 3/2004 | French | ................... | F16C 39/063 310/105 |
| 2005/0242673 A1 * | 11/2005 | Lyons | ..................... | H02K 53/00 310/113 |
| 2007/0210659 A1 * | 9/2007 | Long | ..................... | H02K 49/10 310/80 |
| 2012/0235527 A1 | 9/2012 | Lee | | |
| 2013/0127279 A1 | 5/2013 | Jang | | |

FOREIGN PATENT DOCUMENTS

| | | |
|---|---|---|
| JP | 2011-152033 | 8/2011 |
| JP | 2013179724 A | 9/2013 |
| KR | 10-1998064912 | 10/1998 |
| KR | 10-20080095460 | 11/2008 |
| KR | 10-0909399 | 10/2009 |
| KR | JP4446095 | 12/2009 |
| KR | 10-2010-0019270 | 2/2010 |
| KR | 10-1060197 | 11/2010 |
| KR | 10-20110016589 | 2/2011 |

OTHER PUBLICATIONS

Extended European Search Report mailed Apr. 18, 2016 issued in corresponding European Application No. 15003232.4, 13 pages.

* cited by examiner

MAGNETIC ROTATION ACCELERATOR AND POWER GENERATION SYSTEM INCLUDING THE SAME

This application claims priority from Korean Patent Application No. 10-2014-0160126 filed on Nov. 17, 2014 in the Korean Intellectual Property Office, the disclosure of which is incorporated herein by reference in its entirety.

BACKGROUND

1. Technical Field

The present inventive concept relates to a magnetic rotation accelerator and a power generation system including the same.

2. Description of the Related Art

A driving source (i.e., a driving motor) of a conventional electric generator has a predetermined driving capacity and a predetermined number of revolutions according to each manufacturer's conditions. Therefore, for the electric generator to generate rated power, the output power of the driving motor should be approximately three times that of a motor generator. This reduces the overall generation efficiency and causes a significant waste of energy.

SUMMARY

Aspects of the present inventive concept provide a magnetic rotation accelerator which can achieve high energy efficiency.

Aspects of the present inventive concept also provide a power generation system which can achieve high energy efficiency.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to an aspect of the present inventive concept, there is provided a magnetic rotation accelerator including: a shaft; a fixed plate through which the shaft penetrates and on which a plurality of first magnetic units are disposed; and a rotary plate through which the shaft penetrates, which faces the fixed plate and on which a plurality of second magnetic units are disposed, wherein a repulsive force is generated between the first magnetic units and the second magnetic units, the first magnetic units form a first row and a second row around the shaft, and the second magnetic units form a third row and a fourth row around the shaft, wherein central axes of the first magnetic units of the first row are in phase with central axes of the first magnetic units of the second row, and central axes of the second magnetic units of the third row are out of phase with central axes of the second magnetic units of the fourth row.

The rotary plate may rotate around the shaft while facing the fixed plate, the third row may rotate while facing the first row, and the fourth row may rotate while facing the second row.

The first magnetic units may be separated from each other, and the second magnetic units may be separated from each other.

A gap between the first magnetic units disposed in the second row may be greater than a gap between the first magnetic units disposed in the first row, and a gap between the second magnetic units disposed in the fourth row may be greater than a gap between the second magnetic units disposed in the third row.

The number of the first magnetic units disposed in the first row may be equal to the number of the first magnetic units disposed in the second row.

The number of the second magnetic units disposed in the third row may be equal to the number of the second magnetic units disposed in the fourth row.

The third row may rotate while facing the first row, and the number of the first magnetic units disposed in the first row may be different from the number of the second magnetic units disposed in the third row.

If two straight lines extending from the shaft are drawn, a first magnetic unit of the first row and a first magnetic unit of the second row may contact both of the two straight lines.

A straight line which extends from the shaft and contacts a second magnetic unit of the third row may not contact a second magnetic unit of the fourth row.

The central axes of the first magnetic units may be out of phase with magnetic axes thereof, and the central axes of the second magnetic units may be out of phase with magnetic axes thereof.

The magnetic axis of each of the first magnetic units may form an acute angle in a first (for example, counterclockwise) direction with the central axis thereof, and the magnetic axis of each of the second magnetic units may form an acute angle in a second (for example, clockwise) direction with the central axis thereof.

The fixed plate may have the same size as the rotary plate.

The fixed plate may have a different size from the rotary plate.

According to another aspect of the present inventive concept, there is provided a magnetic rotation accelerator including: a shaft; a fixed plate through which the shaft penetrates and on which a plurality of first magnetic units separated from each other are disposed; and a rotary plate through which the shaft penetrates, which faces the fixed plate and on which a plurality of second magnetic units separated from each other are disposed, wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, and the number of the first magnetic units disposed in the first row is different from the number of the second magnetic units disposed in the third row.

The fourth row may rotate while facing the second row, and the number of the first magnetic units disposed in the second row may be different from the number of the second magnetic units disposed in the fourth row.

Central axes of the first magnetic units may be out of phase with magnetic axes thereof, and central axes of the second magnetic units may be out of phase with magnetic axes thereof According to another aspect of the present inventive concept, there is provided a magnetic rotation accelerator including: a shaft; a fixed plate through which the shaft penetrates and on which a plurality of first magnetic units separated from each other are disposed; and a rotary plate through which the shaft penetrates, which faces the fixed plate and on which a plurality of second magnetic units separated from each other are disposed, wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, and the fourth row rotates while facing the second row, wherein while the rotary plate rotates, a time when the second magnetic units of the third row begin to overlap the first magnetic units of the first row is different from a time when the second magnetic units of the fourth row begin to overlap the first magnetic units of the second row.

According to still another aspect of the present inventive concept, there is provided a magnetic rotation accelerator including: a shaft; a motor which rotates the shaft; a power supply unit which supplies power to the motor; a fixed plate through which the shaft penetrates and on which a plurality of first magnetic units are disposed; and a rotary plate which rotates as the shaft rotates and faces the fixed plate and on which a plurality of second magnetic units are disposed, wherein a repulsive force is generated between the first magnetic units and the second magnetic units, the first magnetic units form a first row and a second row around the shaft, and the second magnetic units form a third row and a fourth row around the shaft, wherein central axes of the first magnetic units of the first row are in phase with central axes of the first magnetic units of the second row, central axes of the second magnetic units of the third row are out of phase with central axes of the second magnetic units of the fourth row, each of the first and second magnetic units has unbalanced magnetic vector waves, the central axes of the first magnetic units are out of phase with magnetic axes thereof, the central axes of the second magnetic units are out of phase with magnetic axes thereof, and the power supply unit repeats the supply and shut-off of power while the rotary plate rotates.

According to still another aspect of the present inventive concept, there is provided a magnetic rotation accelerator including: a shaft; a motor which rotates the shaft; a power supply unit which supplies power to the motor; a fixed plate through which the shaft penetrates and on which a plurality of first magnetic units separated from each other are disposed; and a rotary plate which rotates as the shaft rotates and faces the fixed plate and on which a plurality of second magnetic units separated from each other are disposed, wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, the number of the first magnetic units disposed in the first row is different from the number of the second magnetic units disposed in the third row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

According to still another aspect of the present inventive concept, there is provided a magnetic rotation accelerator including: a shaft; a motor which rotates the shaft; a power supply unit which supplies power to the motor; a fixed plate through which the shaft penetrates and on which a plurality of first magnetic units separated from each other are disposed; and a rotary plate which rotates as the shaft rotates and faces the fixed plate and on which a plurality of second magnetic units separated from each other are disposed, wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, and the fourth row rotates while facing the second row, wherein while the rotary plate rotates, a time when the second magnetic units of the third row begin to overlap the first magnetic units of the first row is different from a time when the second magnetic units of the fourth row begin to overlap the first magnetic units of the second row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

According to still another aspect of the present inventive concept, there is provided a magnetic rotation accelerator including: a shaft; a motor which rotates the shaft; a power supply unit which supplies power to the motor; a fixed plate through which the shaft penetrates and on which a plurality of first magnetic units separated from each other are disposed; and a rotary plate which rotates as the shaft rotates and faces the fixed plate and on which a plurality of second magnetic units separated from each other are disposed, wherein a repulsive force is generated between the first magnetic units and the second magnetic units, the first magnetic units form a first row and a second row around the shaft, and the second magnetic units form a third row and a fourth row around the shaft, wherein if two straight lines extending from the shaft are drawn, a first magnetic unit of the first row and a first magnetic unit of the second row contact both of the two straight lines, a straight line which extends from the shaft and contacts a second magnetic unit of the third row does not contact a second magnetic unit of the fourth row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE INVENTIVE CONCEPT

Figure 1:
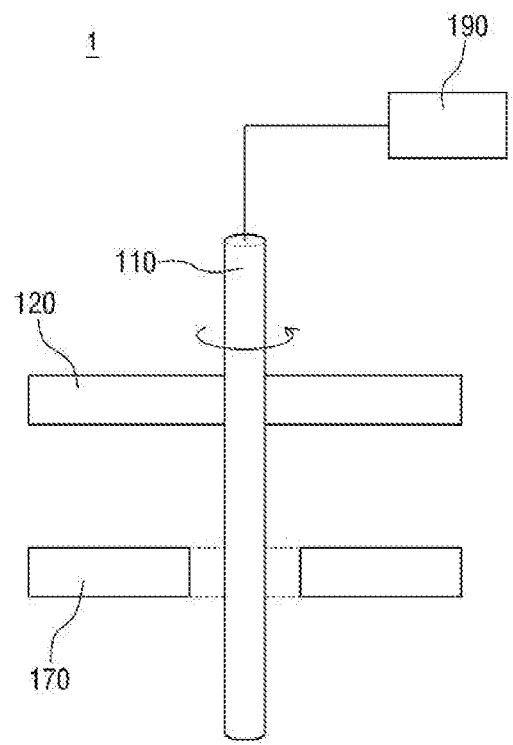
FIG. 1 is a cross-sectional view of a magnetic rotation accelerator according to a first embodiment of the present inventive concept.

Advantages and features of the present inventive concept and methods of accomplishing the same may be understood more readily by reference to the following detailed description of exemplary embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
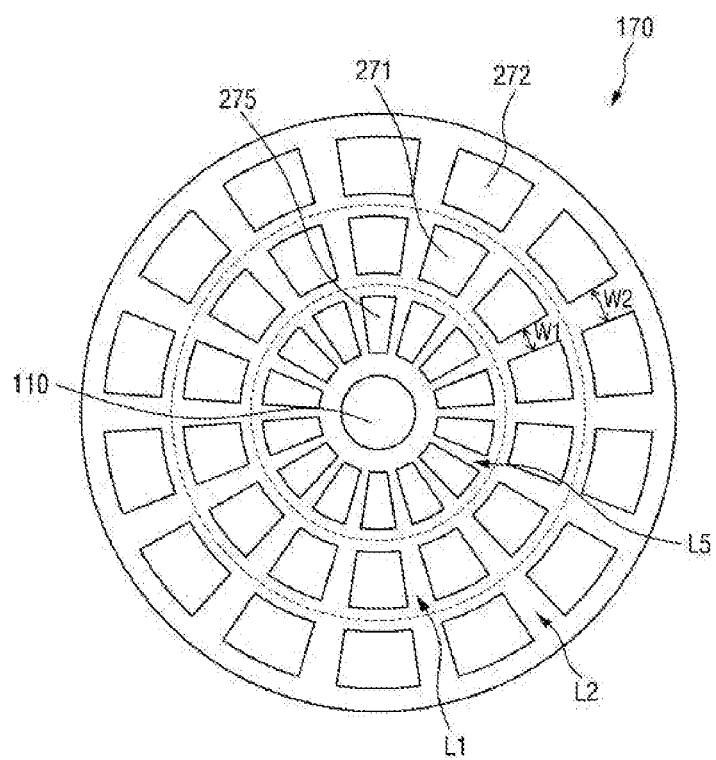
FIG. 2 is a plan view of a fixed plate illustrated in FIG. 1.
Figure 3:
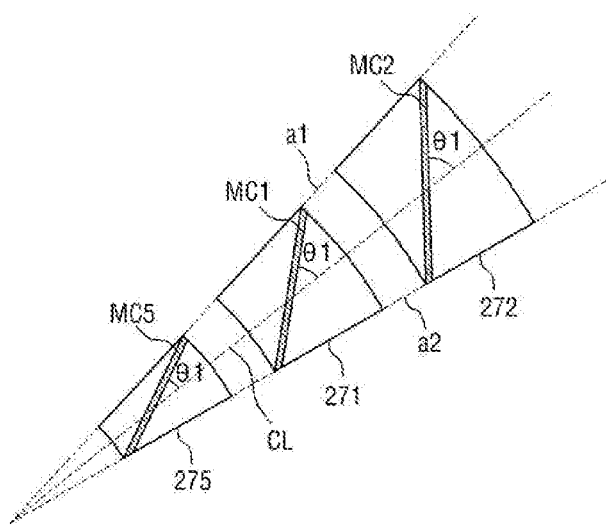
FIG. 3 is a conceptual diagram illustrating the relationship between a plurality of first magnetic units installed on the fixed plate of FIG. 2.
Figure 4A:
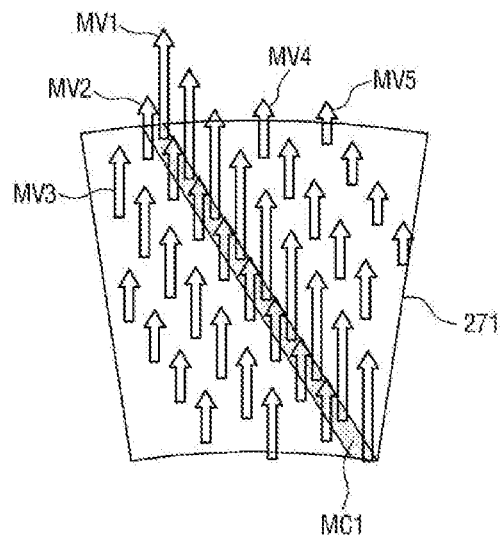
FIGS. 4A, 4B and 5 are conceptual diagrams illustrating a magnetic field of a first magnetic unit installed on the fixed plate of FIG. 2.
Figure 4B:
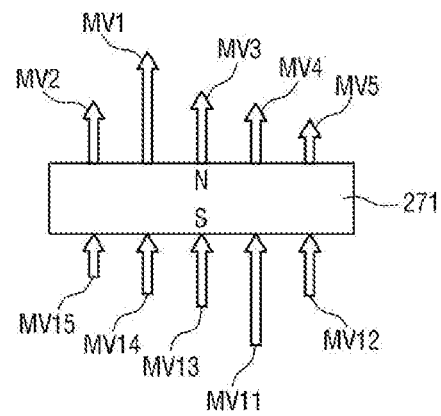
Figure 5:
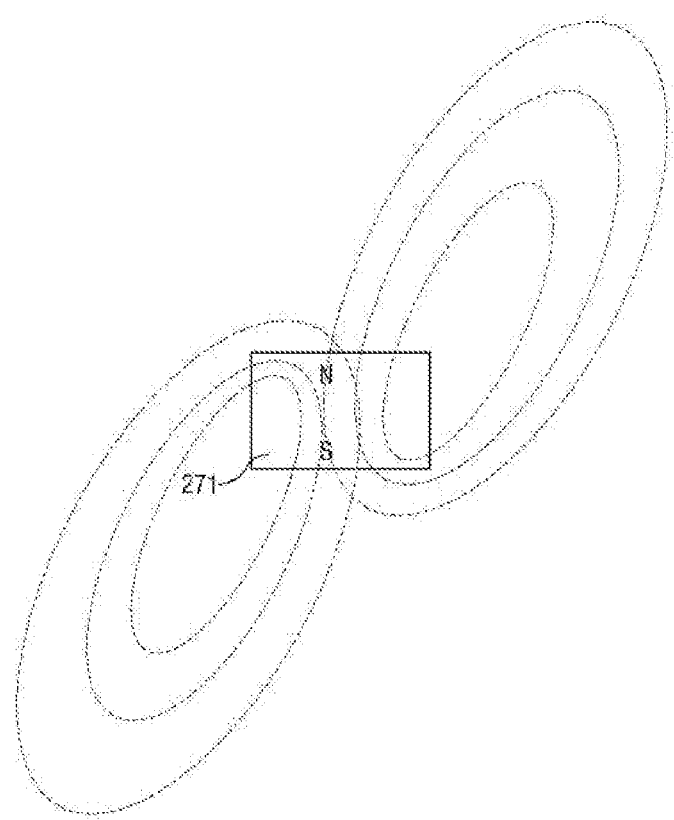
Figure 6:
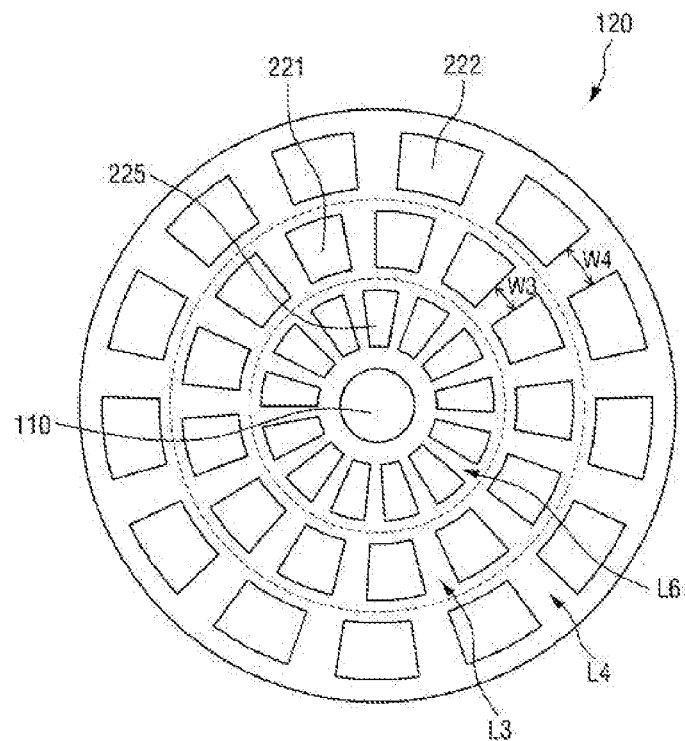
FIG. 6 is a plan view of a rotary plate illustrated in FIG. 1.
Figure 7:
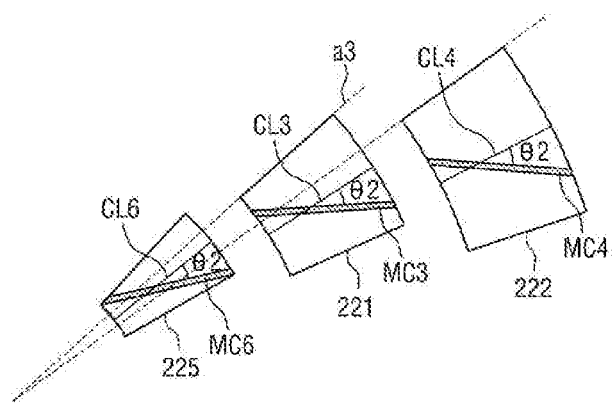
FIG. 7 is a conceptual diagram illustrating the relationship between a plurality of second magnetic units installed on the rotary plate of FIG. 6.
Figure 8:
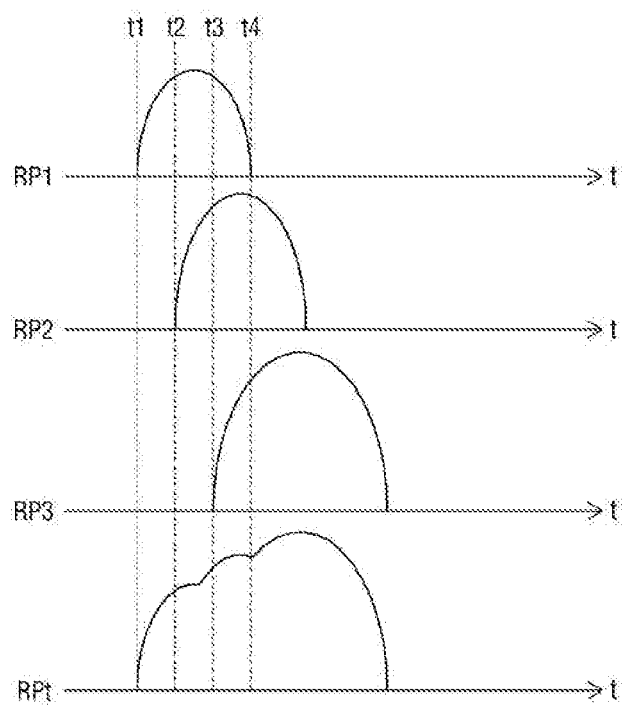
FIG. 8 is a conceptual diagram illustrating a method of driving the magnetic rotation accelerator according to the first embodiment of the present inventive concept.

FIG. 1 is a cross-sectional view of a magnetic rotation accelerator 1 according to a first embodiment of the present inventive concept. FIG. 2 is a plan view of a fixed plate 170 illustrated in FIG. 1. FIG. 3 is a conceptual diagram illustrating the relationship between a plurality of first magnetic units 271, 272 and 275 installed on the fixed plate 170 of FIG. 2. FIGS. 4A, 4B and 5 are conceptual diagrams illustrating a magnetic field of a first magnetic unit 271 installed on the fixed plate 170 of FIG. 2. FIG. 6 is a plan view of a rotary plate 120 illustrated in FIG. 1. FIG. 7 is a conceptual diagram illustrating the relationship between a plurality of second magnetic units 221, 222 and 225 installed on the rotary plate 120 of FIG. 6. FIG. 8 is a conceptual diagram illustrating a method of driving the magnetic rotation accelerator 1 according to the first embodiment of the present inventive concept.

Referring to FIG. 1, the magnetic rotation accelerator 1 according to the first embodiment of the present inventive concept includes a shaft 110, the fixed plate 170, the rotary plate 120, and a power supply unit 190.

The shaft 110 penetrates through the fixed plate 170 and the rotary plate 120.

The first magnetic units 271, 272 and 275 are disposed on the fixed plate 170. The rotary plate 120 is placed to face the fixed plate 170, and the second magnetic units 221, 222 and 225 are disposed on the rotary plate 120. A repulsive force is generated between the first magnetic units 271, 272 and 275 and the second magnetic units 221, 222 and 225. That is, the first magnetic units 271, 272 and 275 have the same polarity as the second magnetic units 221, 222 and 225 which face the first magnetic units 271, 272 and 275. For example, north (N) poles of the first magnetic units 271, 272 and 275 may face N poles of the second magnetic units 221, 222 and 225. Therefore, as illustrated in the drawing, the fixed plate 170 and the rotary plate 120 may be separated by a certain distance.

As illustrated in the drawing, the fixed plate 170 and the rotary plate 120 may be the same size.

The power supply unit 190 is connected to the shaft 110. The power supply unit 190 supplies power to a motor (not illustrated, see FIGS. 16 and 18). The shaft 110 is rotated by the rotation of the motor. In addition, as the shaft 110 rotates, the rotary plate 120 also rotates. The power supply unit 190 may be, but is not limited to, a battery. The use of the battery allows the magnetic rotation accelerator 1 to be easily moved or installed and easily utilized regardless of place. In addition, since the battery is not used much as will be described later, the magnetic rotation accelerator 1 can be utilized for a long time even with a small-capacity battery.

In the magnetic rotation accelerator 1 according to the first embodiment of the present inventive concept, the power supply unit 190 supplies power for a first period of time and does not supply power for a second period of time after the first period of time. Here, the second period of time may be longer than the first period of time. After the second period of time, the power supply unit 190 resumes supplying power. In this way, the power supply unit 190 may supply power periodically. For example, the power supply unit 190 supplies power only for a period of time during which the rotary plate 120 rotates 1,000 to 3,000 times. Then, the power supply unit 190 does not supply power for the second period of time. For the second period of time, the rotary plate 120 may rotate using a magnetic field surfing operation. Magnetic field surfing is a similar concept to wind surfing that uses waves of the sea. When magnetic waves of a magnet are regarded as vectors, magnetic field surfing is to surf fixed magnetic vector waves using rotating magnetic vector waves. Magnetic field surfing can be performed using a relative phase difference of magnetic fields generated between the first magnetic units 271, 272 and 275 installed on the fixed plate 170 and the second magnetic units 221, 222 and 225 installed on the rotary plate 120.

In addition, when the rotary plate 120 rotates slower than a preset speed or after a preset period of time, the power supply unit 190 may supply power to the motor again. Accordingly, the rotary plate 120 may rotate at the preset speed again. In this way, while the rotary plate 120 rotates, the power supply unit 190 may repeat the supply and shut-off of power. For example, the power supply unit 190 may repeat the supply and shut-off of power periodically. Alternatively, the power supply unit 190 may repeat the supply and shut-off of power non-periodically, for example, based on the speed of the rotary plate 120. For example, the power supply unit 190 may check the rotation speed of the rotary plate 120 using a speed sensor and repeat the supply and shut-off of power based on the checking result.

When the surfing operation of the rotary plate 120 is not smooth (or is not performed to a desired degree), the rotary plate 120 may reattempt the surfing operation after the adjustment of the distance between the rotary plate 120 and the fixed plate 170. The distance is a factor that has an important effect on the surfing operation of the rotary plate 120. As the distance between the rotary plate 120 and the fixed plate 170 is reduced, the repulsive force between them increases. When the distance between the rotary plate 120 and the fixed plate 170 becomes a particular value, the rotary plate 120 can rotate fast even with low power.

The exemplary configuration of the fixed plate 170 and the rotary plate 120 for magnetic field surfing will now be described with reference to FIGS. 2 through 7.

First, the fixed plate 170 will be described with reference to FIGS. 2 through 5. A plurality of first magnetic units 271, 272 and 275 are disposed on the fixed plate 170. The first magnetic units 271, 272 and 275 may form a plurality of rows L1, L2 and L5 around the shaft 110. Therefore, a distance from the shaft 110 to a first row L1 may be smaller than a distance from the shaft 110 to a second row L2. In FIG. 2, three rows L1, L2 and L5 are illustrated. However, the number of rows is not limited to three and may also be two or may be in a range of four to six. When the number of rows is greater than six, the magnetic field surfing effect to be described below may not be great.

A plurality of first magnetic units 271, 272 or 275 separated from each other may be arranged in each row L1, L2 or L5.

Specifically, the number of first magnetic units 271 disposed in the first row L1 may be equal to the number of first magnetic units 272 disposed in the second row L2. Fourteen first magnetic units 271 may be disposed in the first row L1, and fourteen first magnetic units 272 may be disposed in the second row L2. In each of the first row L1 and the second row L2, 11 to 24 first magnetic units 271 or 272 may be disposed.

As in the first row L1 and the second row L2, in a fifth row L5 disposed between the shaft 110 and the first row L1, fourteen first magnetic units 275 may be disposed. However, since the fifth row L5 is immediately adjacent to the shaft 110, the number of the first magnetic units 275 may be smaller if there are limitations of space.

In addition, a gap W2 between the first magnetic units 272 disposed in the second row L2 is greater than a gap W1 between the first magnetic units 271 disposed in the first row L1.

Referring to FIG. 3, a central axis CL of a first magnetic unit 271 of the first row L1 may be the same as (i.e., be parallel with) a central axis CL of a first magnetic unit 272 of the second row L2. In other words, a first magnetic unit 275 of the fifth row L5, the first magnetic unit 271 of the first row L1, and the first magnetic unit 272 of the second row L2 may be in phase with each other.

The first magnetic unit 272 of the second row L2 may be larger than the first magnetic unit 271 of the first row L1. The first magnetic unit 271 of the first row L1 may be larger than the first magnetic unit 275 of the fifth row L5.

In addition, if two straight lines a1 and a2 extending from the shaft 110 are drawn, the first magnetic unit 271 of the first row L1 and the first magnetic unit 272 of the second row L2 may contact both of the two straight lines a1 and a2. Here, when the first magnetic unit 271 of the first row L1 and the first magnetic unit 272 of the second row L2 contact both of the two straight lines a1 and a2, sidewalls of the first magnetic units 271 and 272 overlap the two straight lines a1 and a2.

The central axes CL of the first magnetic units 271, 272 and 275 of the rows L1, L2 and L5 may have phase differences with magnetic axes MC1, MC2 and MC5, respectively. The overall system has a phase difference. The central axes CL may be different from the magnetic axes MC1, MC2 and MC5, respectively.

For example, there may be an angle difference of θ1 between a corresponding central axis CL and each of the magnetic axes MC1, MC2 and MC5. Here, θ1 may be an acute angle in a first (for example, counterclockwise) direction from the central axis CL. In FIG. 3, the angle difference between the corresponding central axis CL and each of the magnetic axes MC1, MC2 and MC5 is equal. However, the present inventive concept is not limited thereto. For example, the angle difference between the central axis CL and the magnetic axis MC1 and the angle difference between the central axis CL and the magnetic axis MC2 can change variously.

Referring to FIGS. 4A, 4B and 5, FIG. 4A is a plan view of a first magnetic unit (e.g., 271). For example, the N pole of the first magnetic unit 271 is illustrated in FIG. 4A. FIG. 4B illustrates magnetic vector waves of the first magnetic unit 271. Referring to FIGS. 4A and 4B, the first magnetic unit 271 has an unbalanced magnetic field. Therefore, magnetic vector waves MV1 through MV5 and MV11 through MV15 of the first magnetic unit 271 are unbalanced. For example, the magnetic vector waves MV1 may be largest at the N pole of the first magnetic unit 271 and may be leaned to one side (a left side in FIG. 4B). The magnetic vector waves MV11 may be largest at a south (S) pole of the first magnetic unit 271 and may be leaned to one side (a right side in FIG. 4B).

The magnetic axis MCl may be a continuous flow that connects the largest magnetic vector waves MV1 as illustrated in FIG. 4A.

Referring to FIG. 5, the first magnetic unit 271 may have unbalanced magnetic field lines at the N pole and the S pole. For example, angles of the N pole and the S pole may be, but are not limited to, 0 to 45 degrees, and a magnetic force may be, but is not limited to, 3,000 to 5,000 gausses.

The rotary plate 120 will now be described with reference to FIGS. 6 and 7.

A plurality of second magnetic units 221, 222 and 225 are disposed on the rotary plate 120. The second magnetic units 221, 222 and 225 may form a plurality of rows L3, L4 and L6 around the shaft 110. For example, a distance from the shaft 110 to a third row L3 is smaller than a distance from the shaft 110 to a fourth row L4. In FIG. 6, three rows L3, L4 and L6 are illustrated. However, the number of rows is not limited to three and may also be two or may be four or more.

The third row L3 of the rotary plate 120 rotates while facing the first row L1 of the fixed plate 170, and the fourth row L4 of the rotary plate 120 rotates while facing the second row L2 of the fixed plate 170. A sixth row L6 of the rotary plate 120 rotates while facing the fifth row L5 of the fixed plate 170.

A plurality of second magnetic units 221, 222 or 225 separated from each other are disposed in each row L3, L4 or L6.

Specifically, the number of second magnetic units 221 disposed in the third row L3 may be equal to the number of second magnetic units 222 disposed in the fourth row L4. Thirteen second magnetic units 221 may be disposed in the third row L3, and thirteen second magnetic units 222 may be disposed in the fourth row L4. In each of the third row L3 and the fourth row L4, 11 to 24 second magnetic units 221 or 222 may be disposed.

As in the third row L3 and the fourth row L4, in the sixth row L6 disposed between the shaft 110 and the third row L3, thirteen second magnetic units 225 may be disposed. However, since the sixth row L6 is immediately adjacent to the shaft 110, the number of the second magnetic units 225 may be smaller if there are limitations of space.

As described above, the third row L3, the fourth row L4 and the sixth row L6 rotate while facing the first row L1, the second row L2 and the fifth row L5, respectively.

However, the number of the first magnetic units 271 disposed in the first row L1 is different from the number of the second magnetic units 221 disposed in the third row L3. Likewise, the number of the first magnetic units 272 disposed in the second row L2 may be different from the number of the second magnetic units 222 disposed in the fourth row L4.

In addition, a gap W4 between the second magnetic units 222 disposed in the fourth row L4 is greater than a gap W3 between the second magnetic units 221 disposed in the third row L3.

The second magnetic units 221 disposed in the third row L3 may be larger than the second magnetic units 222 disposed in the fourth row L4. The second magnetic units 221 disposed in the third row L3 may be larger than the second magnetic units 225 disposed in the sixth row L6.

Referring to FIG. 7, a central axis CL3 of a second magnetic unit 221 of the third row L3 may be not parallel to (i.e., have a phase difference with) a central axis CL4 of a second magnetic unit 222 of the fourth row L4. Specifically, the second magnetic unit 221 of the third row L3 may be located behind a second magnetic unit 225 of the sixth row L6 with a phase difference therebetween, and the second magnetic unit 222 of the fourth row L4 may be located behind the second magnetic unit 221 of the third row L3 with a phase difference therebetween. Specifically, a straight line a3 extending from the shaft 110 may contact the second magnetic unit 221 of the third row L3 but may not contact the second magnetic unit 222 of the fourth row L4.

Although not specifically illustrated in the drawings, like the first magnetic units 271, 272 and 275 described above, the second magnetic units 221, 222 or 225 of each row L3, L4 or L6 have unbalanced magnetic vector waves.

The central axes CL3, CL4 and CL6 of the second magnetic units 221, 222 and 225 of the rows L3, L4 and L6 may be not parallel to (i.e., have phase differences with) corresponding magnetic axes MC3, MC4 and MC6, respectively. For example, there may be an angle difference of θ2 between a corresponding central axis CL3, CL4 or CL6 and each of the magnetic axes MC3, MC4 and MC6. Here, θ2 may be an acute angle in a clockwise direction from the central axis CL3, CL4 or CL6. In FIG. 7, the angle difference between the corresponding central axis CL3, CL4 or CL6 and each of the magnetic axes MC3, MC4 and MC6 is equal. However, the present inventive concept is not limited thereto. For example, the angle difference between the central axis CL3 and the magnetic axis MC3 and the angle difference between the central axis CL4 and the magnetic axis MC4 may be different.

A method of driving the magnetic rotation accelerator 1 according to the first embodiment of the present inventive concept will now be described with reference to FIGS. 1 through 8.

First, the power supply unit 190 supplies power to the motor (not illustrated, see reference numeral 301 in FIGS. 16 and 18) for a first period of time. As the motor rotates, the shaft 110 rotates. The first period of time may be determined by the size of the rotary plate 120/the fixed plate 170, the size/magnetic force of the first magnetic units 271, 272 and 275, and the size/magnetic force of the second magnetic units 221, 222 and 225. The first period of time may be a period of time during which the rotary plate 120 is rotated fully to have inertia. For example, the power supply unit 190 may supply power only for a period of time during which the rotary plate 120 rotates 1,000 to 3,000 times.

Then, the power supply unit 190 does not supply power for a second period of time after the first period of time. For the second period of time, the rotary plate 120 may rotate using a magnetic field surfing operation. Here, the second period of time may be a preset, fixed period of time or a variable period of time. After the second period of time, the power supply unit 190 may resume supplying power. In this way, the power supply unit 190 may repeat the supply and shut-off of power periodically.

When the surfing operation of the rotary plate 120 is not smooth (or is not performed to a desired degree), the rotary plate 120 may reattempt the surfing operation after the adjustment of a distance between the rotary plate 120 and the fixed plate 170.

The magnetic field surfing operation will now be described in greater detail with reference to FIG. 8. Referring to FIG. 8, at a time t1, as a first magnetic unit 275 of the fifth row L5 and a second magnetic unit 225 of the sixth row L6 intersect each other (or overlap each other), a first repulsive force RP1 begins to be generated.

The first repulsive force RP1 increases as the intersection area (the overlap area) between the first magnetic unit 275 and the second magnetic unit 225 increases. Therefore, at a time t2, as the rotary plate 120 rotates, the first repulsive force RP1 may increase.

Here, as a first magnetic unit 271 of the first row L1 and a second magnetic unit 221 of the third row L3 intersect each other (or overlap each other), a second repulsive force RP2 begins to be generated. This is because the second magnetic unit 221 of the third row L3 is located behind the second magnetic unit 225 of the sixth row L6 with a phase difference therebetween.

At a time t3, the first repulsive force RP1 is continued because the first magnetic unit 275 of the fifth row L5 and the second magnetic unit 225 of the sixth row L6 still overlap each other.

As the intersection area between the first magnetic unit 271 of the first row L1 and the second magnetic unit 221 of the third row L3 increases, the second repulsive force RP2 may increase.

Here, as a first magnetic unit 272 of the second row L2 and a second magnetic unit 222 of the fourth row L4 intersect each other (or overlap each other), a third repulsive force RP3 begins to be generated. This is because the second magnetic unit 222 of the fourth row L4 is located behind the second magnetic unit 221 of the third row L3 with a phase difference therebetween.

At a time t4, the second repulsive force RP2 is continued because the first magnetic unit 271 of the first row L1 and the second magnetic unit 221 of the third row L3 still overlap each other.

As the intersection area between the first magnetic unit 272 of the second row L2 and the second magnetic unit 222 of the fourth row L4 increases, the third repulsive force RP3 may increase.

Therefore, the rotary plate 120 may rotate over a period of t1 to t4.

In summary, a time when the second magnetic unit 225 of the sixth row L6 begins to overlap the first magnetic unit 275 of the fifth row L5 is different from a time when the second magnetic unit 221 of the third row L3 begins to overlap the first magnetic unit 271 of the first row L1. Likewise, a time when the second magnetic unit 221 of the third row L3 begins to overlap the first magnetic unit 271 of the first row L1 is different from a time when the second magnetic unit 222 of the fourth row L4 begins to overlap the first magnetic unit 272 of the second row L2. Therefore, fixed magnetic vector waves of the fixed plate 170 are surfed using rotating magnetic vector waves of the rotary plate 120 as described above. In addition, θ1 may be an acute angle in the counterclockwise direction from the central axis CL, and θ2 may be an acute angle in the clockwise direction from the central axis CL3, CL4 or CL6. Due to the above configuration, when the rotary plate 120 rotates, the rotating magnetic vector waves of the rotary plate 120 are connected to the fixed magnetic vector waves of the fixed plate 170.

Meanwhile, contrary to illustrated in FIGS. 2 through 8, a central axis CL of a first magnetic unit 271 of the first row L1 may be not parallel with (i.e., have a phase difference with) a central axis CL of a first magnetic unit 272 of the second row L2. In other words, a first magnetic unit 275 of the fifth row L5, the first magnetic unit 271 of the first row L1, and the first magnetic unit 272 of the second row L2 may be not in phase with each other. In this case, a central axis CL3 of a second magnetic unit 221 of the third row L3 may be parallel to a central axis CL4 of a second magnetic unit 222 of the fourth row L4.

Figure 9:
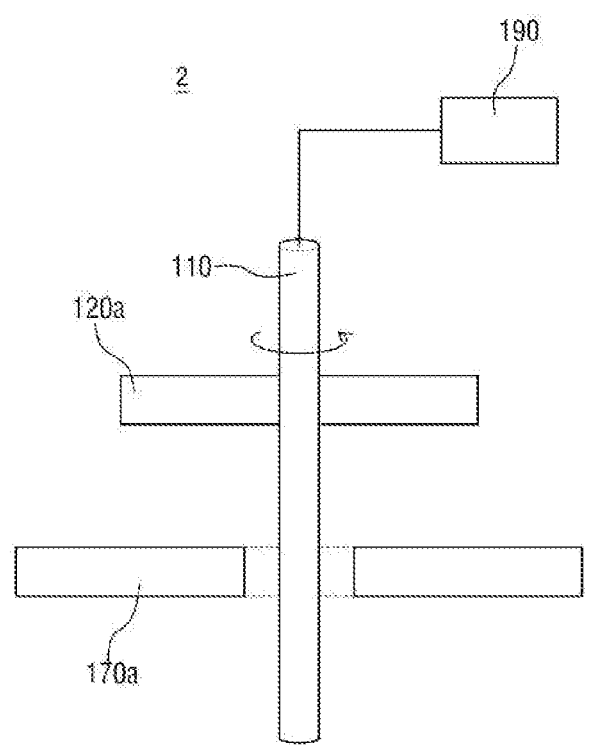
FIG. 9 is a cross-sectional view of a magnetic rotation accelerator according to a second embodiment of the present inventive concept.
Figure 10:
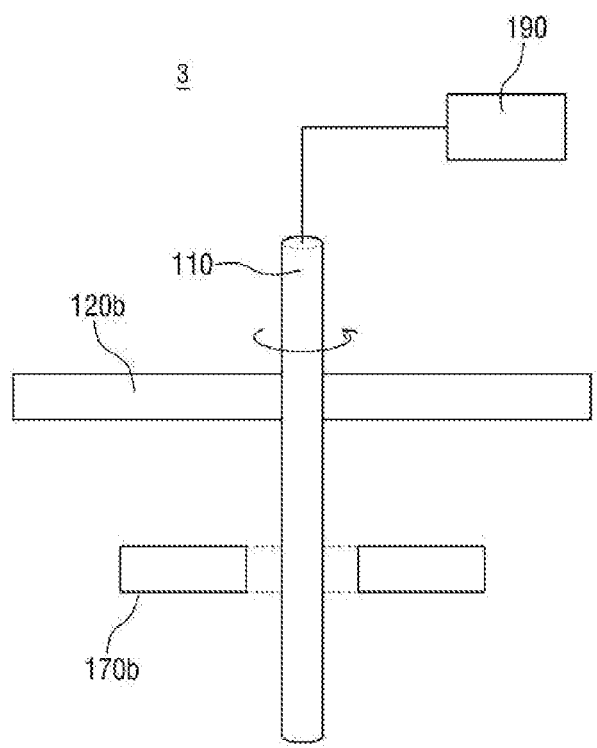
FIG. 10 is a cross-sectional view of a magnetic rotation accelerator according to a third embodiment of the present inventive concept.
Figure 11:
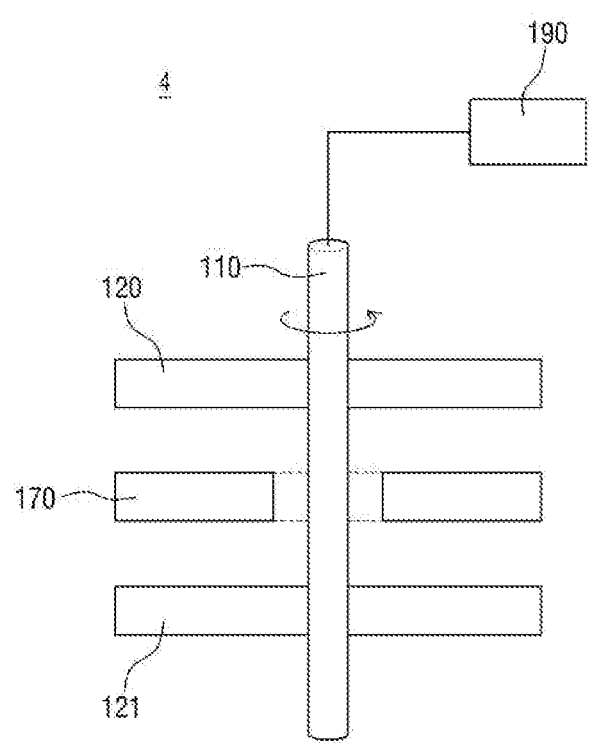
FIG. 11 is a cross-sectional view of a magnetic rotation accelerator according to a fourth embodiment of the present inventive concept.

FIG. 9 is a cross-sectional view of a magnetic rotation accelerator 2 according to a second embodiment of the present inventive concept. FIG. 10 is a cross-sectional view of a magnetic rotation accelerator 3 according to a third embodiment of the present inventive concept. FIG. 11 is a cross-sectional view of a magnetic rotation accelerator 4 according to a fourth embodiment of the present inventive concept. For simplicity, the second through fourth embodiments will be described, focusing mainly on differences with the first embodiment described above with reference to FIGS. 1 through 8.

Referring to FIG. 9, in the magnetic rotation accelerator 2 according to the second embodiment of the present inventive concept, a rotary plate 120a is smaller than a fixed plate 170a. The magnetic rotation accelerator 2 configured in this way is referred to as an inner type magnetic rotation accelerator. First magnetic units 271, 272 and 275 of the fixed plate 170a and second magnetic units 221, 222 and 225 of the rotary plate 120a may be configured as described above.

Referring to FIG. 10, in the magnetic rotation accelerator 3 according to the third embodiment of the present inventive concept, a rotary plate 120b is larger than a fixed plate 170b. The magnetic rotation accelerator 3 configured in this way is referred to as an outer type magnetic rotation accelerator. First magnetic units 271, 272 and 275 of the fixed plate 170 and second magnetic units 221, 222 and 225 of the rotary plate 120 are configured as described above.

Referring to FIG. 11, in the magnetic rotation accelerator 4 according to the fourth embodiment of the present inventive concept, rotary plates 120 and 121 may be disposed on both sides of a fixed plate 170.

Or, two fixed plates may be disposed on both sides of a rotary plate.

The distance between the rotary plate and the fixed plate is a factor that has an important effect on the surfing operation of the rotary plate. As the distance between the rotary plate and the fixed plate is reduced, the repulsive force between them increases. When the distance between the rotary plate and the fixed plate becomes a particular value, the rotary plate can rotate fast even with low power.

Figure 12:
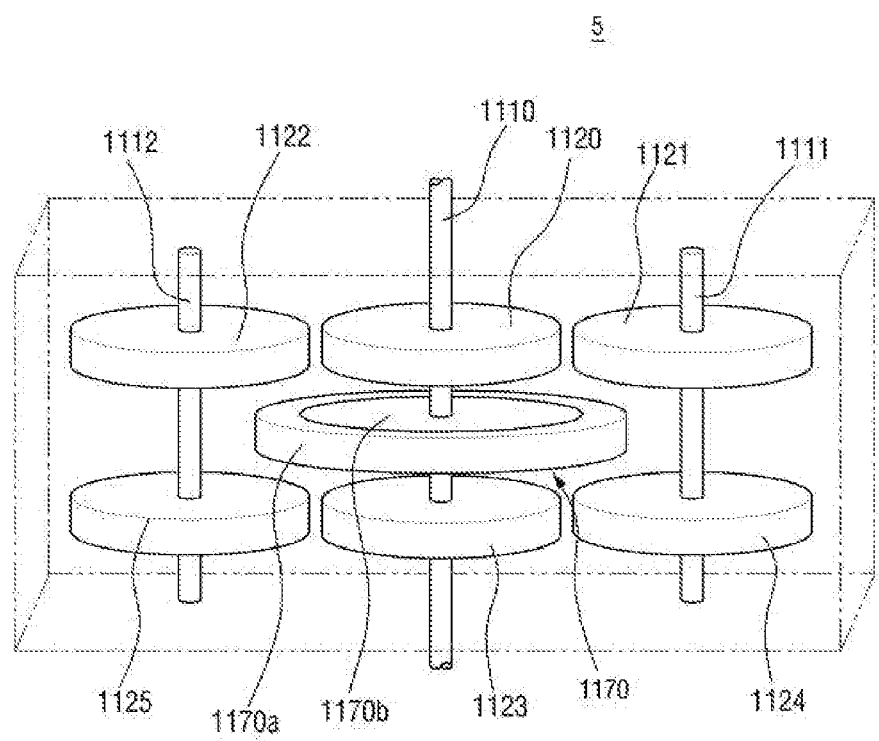
FIG. 12 is a cross-sectional view of a magnetic rotation accelerator according to a fifth embodiment of the present inventive concept.
Figure 13:
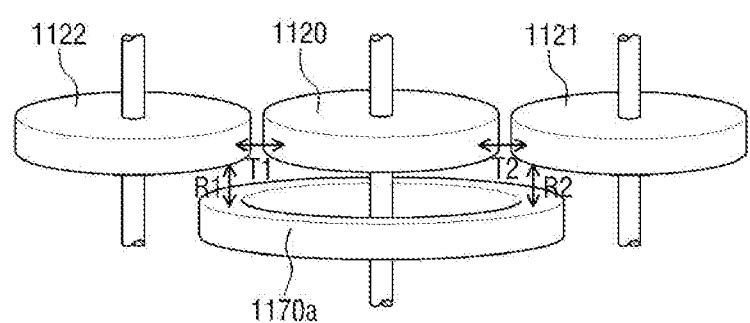
FIGS. 13 and 14 are conceptual diagrams of the magnetic rotation accelerator of FIG. 12.
Figure 14:
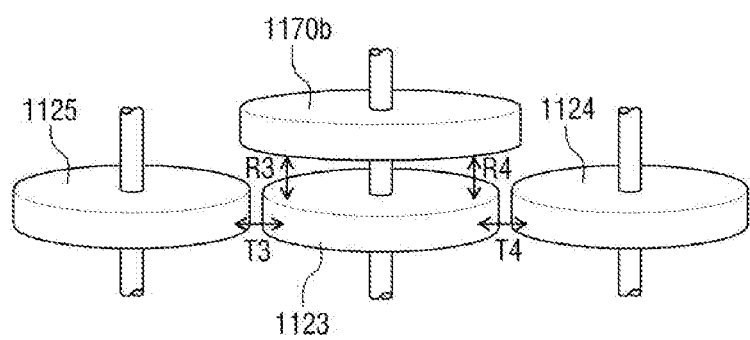

FIG. 12 is a cross-sectional view of a magnetic rotation accelerator 5 according to a fifth embodiment of the present inventive concept. FIGS. 13 and 14 are conceptual diagrams of the magnetic rotation accelerator 5 of FIG. 12. FIGS. 13 and 14 illustrate part of the magnetic rotation accelerator 5 of FIG. 12.

Referring to FIGS. 12 through 14, the magnetic rotation accelerator 5 according to the fifth embodiment of the present inventive concept may include a fixed plate and a plurality of rotary plates, thereby forming a harmonic drive system. The inner type magnetic rotation accelerator and the outer type magnetic rotation accelerator described above may be combined to form a large-sized magnetic rotation accelerator. This magnetic rotation accelerator 5 can be introduced to a power motor or a transportable machine.

A fixed plate 1170 and rotary plates 1120 and 1123 located on and under the fixed plate 1170 are disposed on a shaft 1110. Rotary plates 1121 and 1124 are disposed on a shaft 1111. Rotary plates 1122 and 1125 are disposed on a shaft 1112. At least two of the rotary plates 1120 through 1125 may have different sizes.

The fixed plate 1170 may include a first part 1170b and a second part 1170a formed around the first part 1170b.

Referring to FIG. 13, repulsive forces R1 and R2 are generated among the second part 1170a of the fixed plate 1170 and the rotary plates 1120, 1121 and 1122. In addition, repulsive forces T1 and T2 may be generated among the rotary plates 1120, 1121 and 1122.

Referring to FIG. 14, repulsive forces R3 and R4 are generated among the first part 1170b of the fixed plate 1170 and the rotary plates 1123, 1124 and 1125. In addition, repulsive forces T3 and T4 may be generated among the rotary plates 1123, 1124 and 1125.

In the above configuration, a plurality of corresponding rotary plates can be rotated using one fixed plate.

Figure 15:
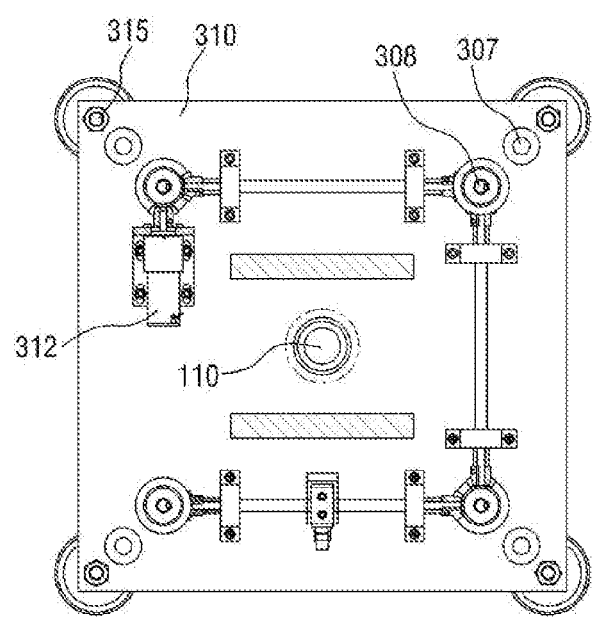
FIG. 15 is a plan view of a magnetic rotation accelerator according to a sixth embodiment of the present inventive concept.
Figure 16:
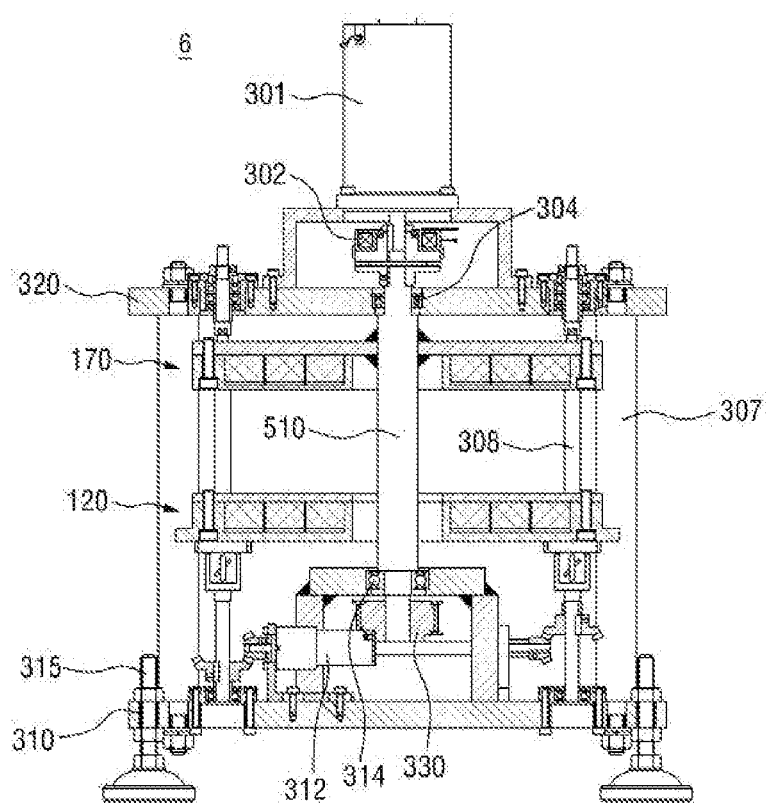
FIG. 16 is a cross-sectional view of the magnetic rotation accelerator according to the sixth embodiment of the present inventive concept.

FIG. 15 is a plan view of a magnetic rotation accelerator 6 according to a sixth embodiment of the present inventive concept. FIG. 16 is a cross-sectional view of the magnetic rotation accelerator 6 according to the sixth embodiment of the present inventive concept. FIGS. 15 and 16 illustrate a specific implementation of the magnetic rotation accelerator 1 of FIGS. 1 through 7.

Referring to FIGS. 15 and 16, the magnetic rotation accelerator 6 according to the sixth embodiment of the present inventive concept may include a fixed plate 170, a rotary plate 120, a motor 301, an electronic clutch 302, ball bearings 304 and 314, ball screws 308, guide shafts 307, a lower support 310, an upper support 320, a geared motor 312, leveling feet 315, and a pulley 330.

The guide shafts 307 are disposed between the lower support 310 and the upper support 320. The guide shafts 307 are placed to separate the lower support 310 and the upper support 320. For example, four guide shafts 307 may be disposed at corners of the lower support 310 and corners of the upper support 320. The leveling feet 315 may be used to adjust the height of the lower support 310.

The electronic clutch 302 and the motor 301 may be disposed on the upper support 320. The motor 301 may or may not be rotated by the ON/OFF operation of the electronic clutch 302. The motor 301 may include a battery. The motor 301 may be, but is not limited to, a direct current (DC) motor.

Components such as the fixed plate 170, the rotary plate 120, a shaft 110, and the geared motor 312 may be disposed in a space between the lower support 310 and the upper support 320. The shaft 110 is connected to the motor 301 and rotated by the operation of the motor 301. As described above with reference to FIGS. 1 through 7, the motor 301 may be turned on for a first period of time and turned off for a second period of time after the first period of time. While the motor 301 is turned off, the rotary plate 120 may be rotated by a magnetic field surfing operation.

The geared motor 312 is connected to the ball screws 308. The geared motor 312 is used to adjust a distance between the fixed plate 170 and the rotary plate 120. The geared motor 312 can raise or lower the fixed plate 170 or raise or lower the rotary plate 120. Repulsive forces of magnets can be controlled by adjusting the distance.

Figure 17:
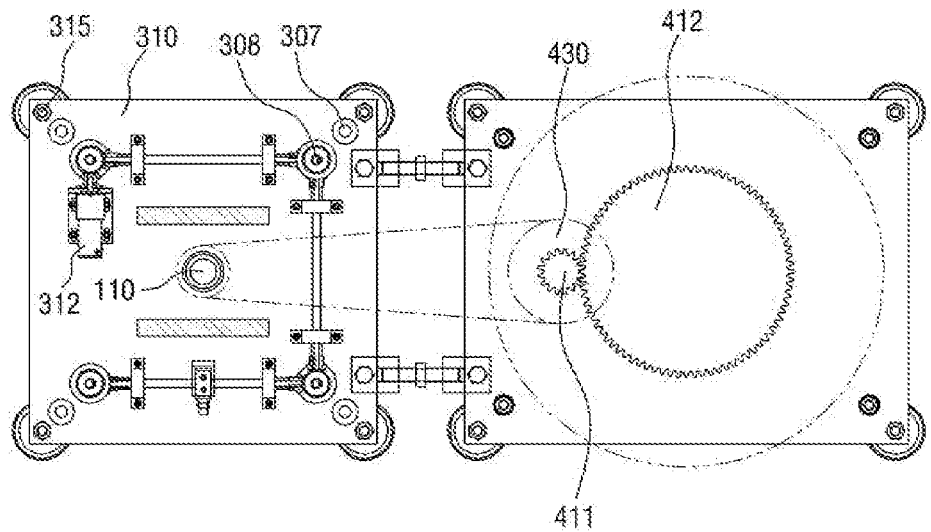
FIGS. 17 and 18 are plan and cross-sectional views of a power generation system according to embodiments of the present inventive concept.
Figure 18:
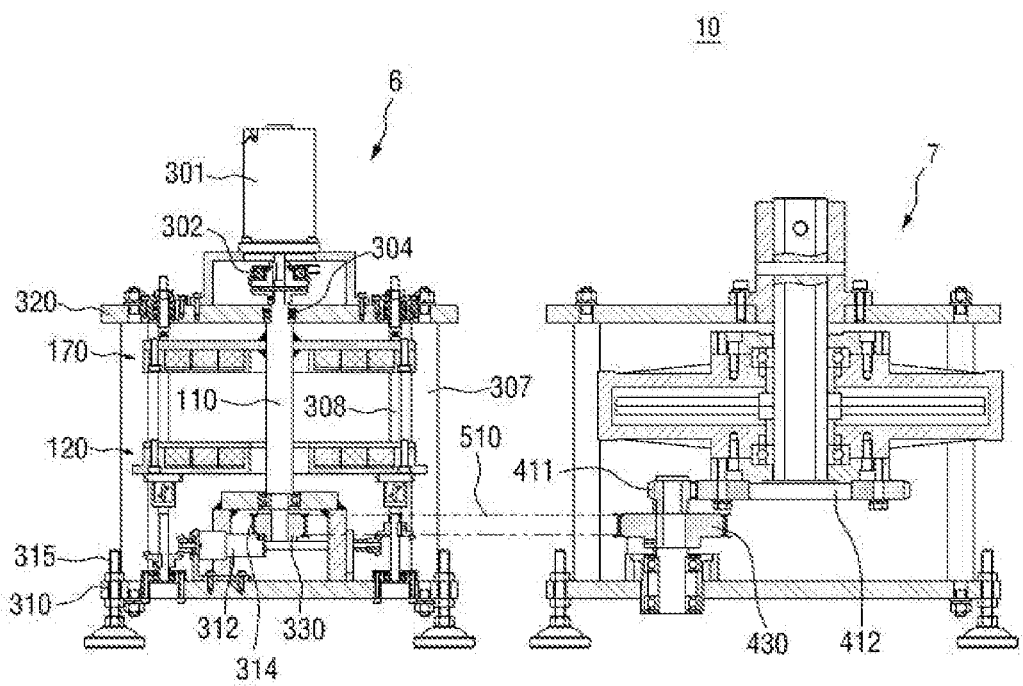

FIGS. 17 and 18 are plan and cross-sectional views of a power generation system according to embodiments of the present inventive concept.

Referring to FIGS. 17 and 18, the power generation system 10 according to the embodiments of the present inventive concept includes a magnetic rotation accelerator 6 and an electric generator 7 which generates electricity when receiving power from the magnetic rotation accelerator 6.

As described above, the magnetic rotation accelerator 6 may include a shaft 110, a fixed plate 170 through which the shaft 110 penetrates and on which first magnetic units 271, 272 and 275 are disposed, and a rotary plate 120 through which the shaft 110 penetrates, which faces the fixed plate 170 and on which a plurality of second magnetic units 221, 222 and 225 are disposed. A repulsive force is generated between the first magnetic units 271, 272 and 275 and the second magnetic units 221, 222 and 225. The first magnetic units 271, 272 and 275 form a first row L1 and a second row L2 around the shaft 110. Central axes of the first magnetic units 271 of the first row L1 are in phase with central axes of the first magnetic units 272 of the second row L2. The second magnetic units 221, 222 and 225 form a third row L3 and a fourth row L4 around the shaft 110, and central axes of the second magnetic units 221 of the third row L3 are out of phase with central axes of the second magnetic units 222 of the fourth row L4. A motor 301 is turned on for a first period of time and turned off for a second period of time after the first period of time. While the motor 301 is turned off, the rotary plate 120 may be rotated by a magnetic field surfing operation.

In addition, a pulley 330 is installed on the shaft 110 of the magnetic rotation accelerator 6. The pulley 330 and a pulley 430 of the electric generator 7 are connected to each other by a belt 510. The pulley 430 is connected to a first gear 411, and the first gear 411 engages with a second gear 412. Therefore, when the shaft 110 of the magnetic rotation accelerator 6 rotates, a turning force is transmitted to the electric generator 7 through the pulleys 330 and 430, the belt 510 and the first and second gears 411 and 412. The electric generator 7 generates electricity using this turning force.

When the magnetic rotation accelerator 6 is used, the motor 301 operates only for a required period of time. In the other period of time, the magnetic rotation accelerator 6 operates through the magnetic field surfing operation. Therefore, the power generation system 10 employing the magnetic rotation accelerator 6 has high overall generation efficiency and hardly wastes energy.

While the present inventive concept has been particularly shown and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:

1. A magnetic rotation accelerator comprising:
a shaft;
a motor which rotates the shaft;
a power supply unit which supplies power to the motor;
a fixed plate through which the shaft penetrates and on which a plurality of first magnetic units are disposed; and
a rotary plate which rotates as the shaft rotates and faces the fixed plate and on which a plurality of second magnetic units are disposed,
wherein a repulsive force is generated between the first magnetic units and the second magnetic units, the first magnetic units form a first row and a second row around the shaft, and the second magnetic units form a third row and a fourth row around the shaft, wherein central axes of the first magnetic units of the first row are in phase with central axes of the first magnetic units of the second row, central axes of the second magnetic units of the third row are out of phase with central axes of the second magnetic units of the fourth row, each of the first and second magnetic units has unbalanced magnetic vector waves, the central axes of the first magnetic units are out of phase with magnetic axes thereof, the central axes of the second magnetic units are out of phase with magnetic axes thereof, and the power supply unit repeats the supply and shut-off of power while the rotary plate rotates.

2. The magnetic rotation accelerator of claim 1, wherein the rotary plate rotates around the shaft while facing the fixed plate, the third row rotates while facing the first row, and the fourth row rotates while facing the second row.

3. The magnetic rotation accelerator of claim 1, wherein a gap between the first magnetic units disposed in the second row is greater than a gap between the first magnetic units disposed in the first row, and a gap between the second magnetic units disposed in the fourth row is greater than a gap between the second magnetic units disposed in the third row.

4. The magnetic rotation accelerator of claim 1, wherein the number of the first magnetic units disposed in the first row is equal to the number of the first magnetic units disposed in the second row.

5. The magnetic rotation accelerator of claim 4, wherein the number of the second magnetic units disposed in the third row is equal to the number of the second magnetic units disposed in the fourth row.

6. The magnetic rotation accelerator of claim 5, wherein the third row rotates while facing the first row, and the number of the first magnetic units disposed in the first row is different from the number of the second magnetic units disposed in the third row.

7. The magnetic rotation accelerator of claim 1, wherein if two straight lines extending from the shaft are drawn, a first magnetic unit of the first row and a first magnetic unit of the second row contact both of the two straight lines.

8. The magnetic rotation accelerator of claim 7, wherein a straight line which extends from the shaft and contacts a second magnetic unit of the third row does not contact a second magnetic unit of the fourth row.

9. The magnetic rotation accelerator of claim 1, wherein the power supply unit supplies power to the motor for a first period of time, the motor operates when supplied with power from the power supply unit, the rotary plate rotates as the shaft connected to the motor rotates, the power supply unit does not supply power to the motor for a second period of time after the first period of time, the rotary plate performs a magnetic field surfing operation for the second period of time, and the power supply unit supplies power to the motor again after the second period of time.

10. The magnetic rotation accelerator of claim 1, wherein the magnetic axis of each of the first magnetic units forms an acute angle in a first direction with the central axis thereof, and the magnetic axis of each of the second magnetic units forms an acute angle in a second direction with the central axis thereof.

11. The magnetic rotation accelerator of claim 1, wherein the fixed plate has the same size as the rotary plate.

12. The magnetic rotation accelerator of claim 1, wherein the fixed plate has a different size from the rotary plate.

13. A magnetic rotation accelerator comprising:
a shaft;
a motor which rotates the shaft;
a power supply unit which supplies power to the motor;
a fixed plate through which the shaft penetrates and on which a plurality of first magnetic units separated from each other are disposed; and
a rotary plate which rotates as the shaft rotates and faces the fixed plate and on which a plurality of second magnetic units separated from each other are disposed,
wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, the number of the first magnetic units disposed in the first row is different from the number of the second magnetic units disposed in the third row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

14. The magnetic rotation accelerator of claim 13, wherein the fourth row rotates while facing the second row, and the number of the first magnetic units disposed in the second row is different from the number of the second magnetic units disposed in the fourth row.

15. A magnetic rotation accelerator comprising:
a shaft;
a motor which rotates the shaft;
a power supply unit which supplies power to the motor;
a fixed plate through which the shaft penetrates and on which a plurality of first magnetic units separated from each other are disposed; and
a rotary plate which rotates as the shaft rotates and faces the fixed plate and on which a plurality of second magnetic units separated from each other are disposed,
wherein a repulsive force is generated between the first magnetic units and the second magnetic units, the first magnetic units form a first row and a second row around the shaft, and the second magnetic units form a third row and a fourth row around the shaft, wherein the third row rotates while facing the first row, and the fourth row rotates while facing the second row, wherein while the rotary plate rotates, a time when the second magnetic units of the third row begin to overlap the first magnetic units of the first row is different from a time when the second magnetic units of the fourth row begin to overlap the first magnetic units of the second row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

16. A magnetic rotation accelerator comprising:
a shaft;
a motor which rotates the shaft;
a power supply unit which supplies power to the motor;
a fixed plate through which the shaft penetrates and on which a plurality of first magnetic units separated from each other are disposed; and
a rotary plate which rotates as the shaft rotates and faces the fixed plate and on which a plurality of second magnetic units separated from each other are disposed,
wherein a repulsive force is generated between the first magnetic units and the second magnetic units, the first magnetic units form a first row and a second row around the shaft, and the second magnetic units form a third row and a fourth row around the shaft, wherein if two straight lines extending from the shaft are drawn, a first magnetic unit of the first row and a first magnetic unit of the second row contact both of the two straight lines, a straight line which extends from the shaft and contacts a second magnetic unit of the third row does not contact a second magnetic unit of the fourth row, each of the first and second magnetic units has unbalanced magnetic vector waves, central axes of the first magnetic units are out of phase with magnetic axes thereof, central axes of the second magnetic units are out of phase with magnetic axes thereof, and the power supply unit repeats the supply and shut-off of power while the rotary plate rotates.

* * * * *